Aug. 30, 1949.     E. G. GAGE     2,480,234
CATHODE-RAY DIRECTION FINDER

Filed May 3, 1946     3 Sheets-Sheet 1

INVENTOR.
EDWARD G. GAGE

BY
*Fred L. Schuetz*
ATTORNEY.

Aug. 30, 1949.  E. G. GAGE  2,480,234

CATHODE-RAY DIRECTION FINDER

Filed May 3, 1946  3 Sheets-Sheet 3

INVENTOR.
EDWARD G. GAGE

BY
Fred'k L. Schuetz
ATTORNEY

Patented Aug. 30, 1949

2,480,234

UNITED STATES PATENT OFFICE 2,480,234

CATHODE-RAY DIRECTION FINDER

Edward G. Gage, Brooklyn, N. Y., assignor of two-thirds to Leon Ottinger, New York, N. Y.

Application May 3, 1946, Serial No. 666,907

31 Claims. (Cl. 343—112)

The invention relates to improvements in cathode ray radio direction finders; and it relates more especially to direction finders of the Watson-Watt type, in which the differential action of two loops or direction finding antennae causes a displacement of the beam spot of the cathode ray tube on its viewing screen. The present application is a continuation-in-part of my copending application Serial No. 485,113, now Patent 2,399,671, issued May 7, 1946.

Heretofore, Watson-Watt type radio direction finders or radio compasses have depended upon perfect phasing of the alternating current components of the two receivers employed—one for each direction finding loop or antenna, to produce a visual indication of direction on the screen. However, the difficulty of maintaining the alternating current components in perfect phase have retarded the commercial use of instruments of this type.

Another objection has been the quadrantal ambiguity which existed, that is, the uncertainty of determining from which quadrant of the 360° azimuth scale the signals were arriving. Still another objection was the difficulty of maintaining equality of signals between the two receivers employed.

The present invention has for an object to provide a cathode ray radio compass in which the difficulty of phasing alternating current components is eliminated.

Another object of the invention is to provide a cathode ray radio compass in which quadrantal ambiguity is not present.

Still another object of the invention is to provide a cathode ray radio compass wherein it is possible to maintain equality of signals between a pair of receivers.

A further object of the invention is to provide a cathode ray radio compass assembly by means of which it is possible to receive direction finding signals simultaneously from several transmitting stations, and indicate the same on a common screen.

A still further object of the invention is to provide a cathode ray radio compass wherein transmitted signals as received may be provided with characterizations to identify the particular transmitting station.

The invention has for an object, also, to provide a cathode ray radio compass with which signals caused by either modulated or unmodulated electromagnetic waves may be received, as well as to provide for the reduction of interference due to static.

In carrying out the invention, the alternating current components of the receivers' outputs are changed to direct current in the form of highly peaked pulses of short duration, it being understood that such direct current pulses are easily maintained in phase. The resultant is a perfectly straight and fine illuminated line which extends radially from the center of the viewing screen outwardly in the direction of the transmitting station from which the signals originated. By introducing pulse modulation either at the receiver or at the transmitting station, and by sequential pulse activation in combination with reflecting shields, in the case of a plurality of transmitting stations, the visual direction finding indication may be caused to appear in the proper or a predetermined quadrant of the viewing screen.

Equality of received signals may be maintained between a pair of receivers by causing a single non-directional antenna instead of the directional antenna to be sequentially switched into the circuit of each receiver, thus producing a visual signal indication in the form of a straight line and indicative of the reception intensity of the particular receiver. This line appears simultaneously with the line produced by the direction finder signal, but is in a different portion of the screen quadrant therefrom which makes it possible to view both the direction finding signal indication and the signal quality indication simultaneously.

The nature of the invention, however, will best be understood when described in connection with the accompanying drawings, in which:

Figs. 5—a, 5—b, 5—c, 5—d illustrate various pulse wave forms of the electromagnetic waves which may be utilized in the direction finding system.

Fig. 6 is a schematic diagram of the novel compass as adapted for the reception of modulated waves from a source or sources of electro magnetic waves.

Fig. 6—a is an elevation of a cathode ray tube of the compass.

Fig. 7 is a schematic diagram illustrating a modification of the compass in the provision of switching means whereby to disable sequentially all but two pairs of the receiver channels.

Figure 1:
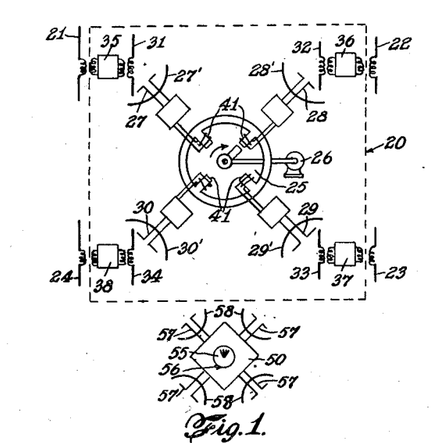
Fig. 1 is a schematic diagram illustrating a direction finding system wherein is utilized the novel direction finder receiving electromagnetic waves transmitted from a source, said waves being pulse modulated for use.

Referring to Fig. 1 of the drawings, 20 designates a transmitting station or source of electromagnetic waves, said station comprising a group of beacon transmitters 21, 22, 23, and 24 spaced in azimuth, all preferably operating at the same frequency and each being omni-directional. Energization of the said beacon transmitters is accomplished indirectly by relay pulse-modulated electromagnetic waves of short duration. This energization may be provided from a more or less distant pulse generator 25 driven by a motor 26 and both located, in the example shown, substantially at the center of the group of transmitters 21, 22, 23, and 24 spaced around the same. The said generator to this end delivers beamed energy sequentially to a like number of transmitters 27, 28, 29 and 30 spaced about the generator correspondingly to the spacing of the beacon transmitters 21, 22, 23 and 24.

These transmitters 27, 28, 29 and 30 are provided with reflectors 27', 28', 29' and 30', respectively, to direct beamed short waves toward the respective said beacon transmitters in sequence, each of which latter transmitters is provided with its individual receiving antenna such as the antennae 31, 32, 33 and 34 respectively. These latter antennae are tuned to the said transmitting antennae 27, 28, 29 and 30, receiver-amplifiers 35, 36, 37 and 38 and the beacon transmitters, which latter retransmit sequentially the pulse energy at the desired frequency. By this expedient, cable connection for transmitting power from the pulse generator to the more or less distant and individual beacon transmitters of the transmitter station 20 are avoided.

If the beacon transmitters are tuned to receive waves of different frequencies, as transmitted from the transmitters 27, 28, 29 and 30, then the corresponding said reflectors may be omitted since the signals will be selectively received for re-transmission from the beacon transmitters 21, 22, 23 and 24 all, however, at the same frequency.

Figure 3:
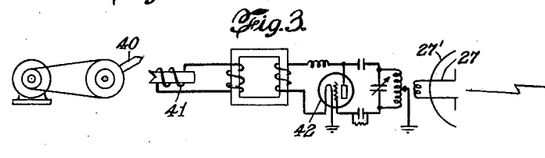
Figs. 3 and 4 illustrate diagrammatically details of beaming transmitters and beacon transmitters of a transmitting station of the nature indicated in Fig. 1.

A suitable form of pulse generating system is indicated in Fig. 3, the same being of the mechanical type comprising an alternating current generator having a unipolar rotating field 40 of the permanent magnet type associated with a plurality of armature coil poles 41, in number corresponding to the number of transmitters—only one armature coil pole, however, being indicated with its circuit. The various poles of the coil armatures may be notched, each with a different number of notches which will have the effect of producing a "kink" or interruption in the signal line produced on the screen of the cathode ray tube of the direction finding receiver, hereinafter more fully set forth. The purpose of such "kink" or like mark is to identify the position of the particular beacon transmitter, the number along the length of a signal line being a reproduction of the number of notches of a pole and their distance apart along the line being determined by the rotational velocity of the pulse generator.

A pulse originating in a coil 41 serves to energize the plate circuit of a transmitting oscillator 42 which then oscillates momentarily and produces a short train of waves of radio frequency, for example of 100 mc. The power provided should be sufficient to permit the waves transmitted by a beamed transmitter 27, 28, 29 and 30 to cover the distance to the beacon transmitter corresponding to the particular armature coil pole, for example, approximately one mile.

Figure 4:
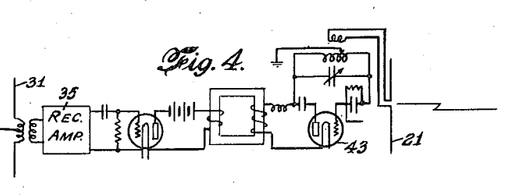

The waves thus sequentially beamed toward the beacon transmitters are received by corresponding receiving antennae 31, 32, 33 and 34, each detected by and amplified by its associated receiver-amplifier unit 35, 36, 37 and 38 without materially changing its straight line characteristic, coupled to a corresponding beacon transmitter 21, 22, 23 and 24. Thus, reference being had to Fig. 4, the amplified energy received by antenna 31 is applied to the plate circuit of a beacon transmitter oscillator 43, for example, which in turn oscillates momentarily and energizes its transmitting antenna 21 to radiate a pulse which may have a frequency, say, of 10 mc. This is the direction finding pulse which is received by the novel cathode ray tube direction finder or compass. Various types of waves suitable for transmission by the said beacon transmitters are indicated in Figs. 5—a, 5—b, 5—c and 5—d; and their production and manner of application in the operation of the novel direction finding compass will hereinafter be more fully set forth.

Figure 2:
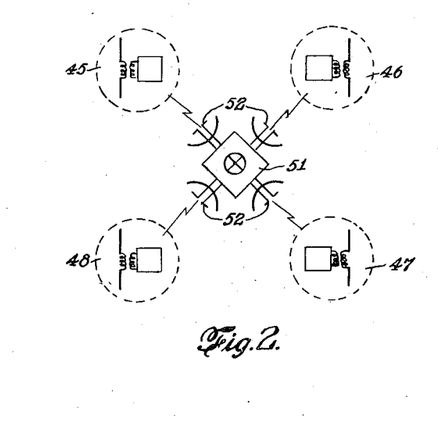
Fig. 2 is a similar view but wherein the electromagnetic waves transmitted are of the continuous wave type.

Alternatively, and as indicated in Fig. 2, the pulse modulation need not be effected at the transmitting station but the generator may be located at a receiver station, as will hereinafter be more fully set forth. In such case, energy is derived from a continuous wave beacon transmitter or transmitters. Thus one or more beacon transmitters may be utilized and may operate at the same frequency provided that reception is effected for visual indication in separate quadrants of a cathode ray tube screen. If reception is to be visually indicated in the same quadrant, in instances where a plurality of continuous wave beacon transmitters are utilized, these transmitters must then be operated at differing frequencies.

In the example shown in Fig. 2 of the drawings, a plurality of vertically polarized beacon transmitters 45, 46, 47 and 48 define a transmission zone and are of the continuous wave type, or broadcast transmitters provided they are vertically polarized.

Whether the transmitting station be of a nature to transmit pulse modulated electromagnetic waves, as in the case of the station 20, Fig. 1, or continuous electromagnetic waves are transmitted, as in the case of the transmission zone, Fig. 2, said waves are to be received at a single receiver unit or station such as station 50, Fig. 1, which particular station is designed to receive waves modulated at the transmitter station. Whereas, in the case of waves from the transmitters at the transmission zone which are continuous, the pulse modulation will be embodied at the receiving station 51 provided with shielded antennae 52, all as will hereinafter be more fully set forth.

Figures 6, 6A, 7:
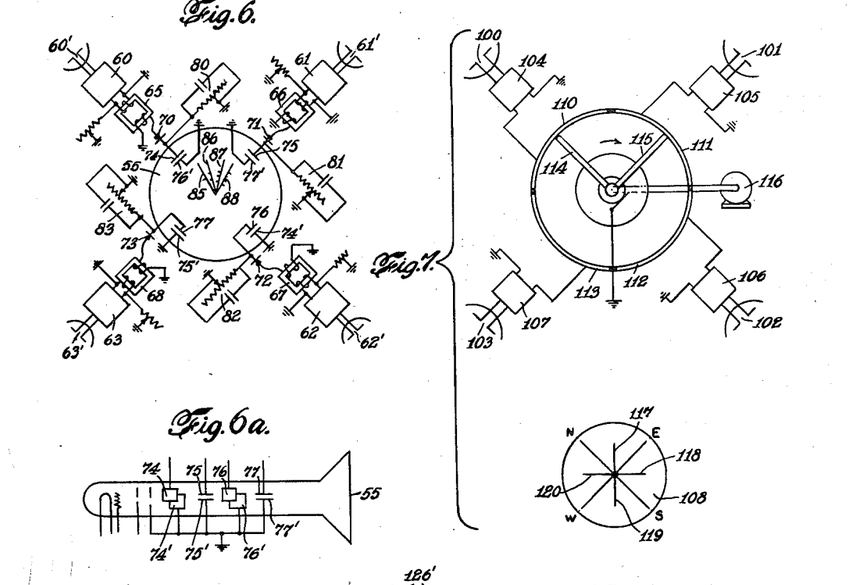

In the former embodiment, the receiver station 50 is shown to comprise a plurality of receivers—in the specific embodiment shown, four, corresponding in number to the number of transmitters of the station 20. These receivers may be of the superheterodyne type with resultant signal of audio frequency; and their outputs are intended to effect visual indications upon the screen 55 of a suitable cathode ray tube 56, Figs. 1, 6 and 6—a. Each receiver is provided with a directional antenna, for example, the vertical di-pole antenna 57 shown. However, equivalent, well-known types of directional antennae such as a loop (not shown) may be substituted therefor and should be located in a vertical plane along the axis of its reflecting shields, and adjacent loops at an angle to each other.

It is to be understood that either vertical or horizontal di-poles may be used provided the transmitter is correspondingly polarized. If vertical di-poles are used, then the reception angle in azimuth depends almost entirely upon reflectors associated with the antennae and hereinafter described. If horizontal di-poles are used, there is some directive effect in azimuth as is well understood, the direction of maximum reception being along a line at right angles to the line formed by the di-poles, and minimum reception along a line parallel and co-axial with said di-pole antennae.

Provision is made to shield the respective receivers to limit their respective reception angles to an extent not to exceed a predetermined arc, for example, 90°, as in surrounding each by a parabolic or like reflector 58, in order to prevent confusion in the indications on the screen 55 caused by quadrantal ambiguity.

Figures 8, 9:
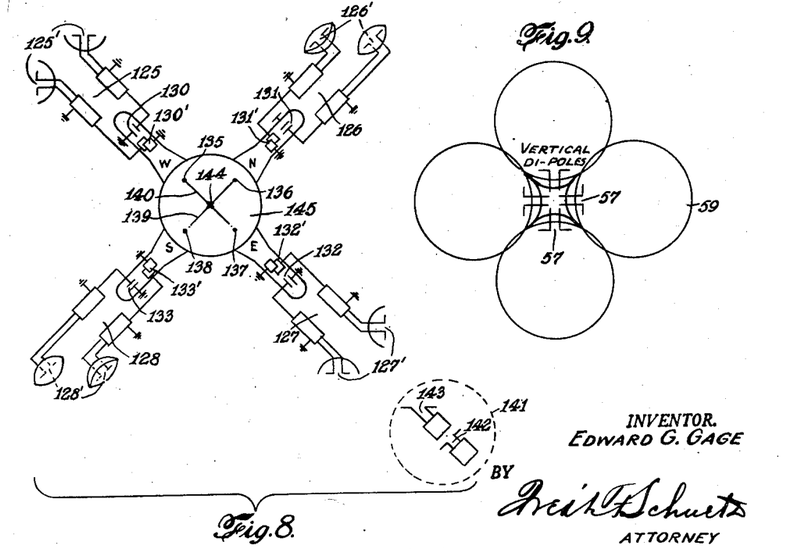
Fig. 8 is a schematic diagram of a further modification and illustrates the use of a compass provided with multiple pairs of receiver channels with independent cathode ray tube structures associated therewith having a common viewing screen.
Fig. 9 is a polar diagram illustrating the effect of the shielding means in the novel arrangement for eliminating quadrantal ambiguity.

The effect of a reflector or shield on a horizontal or a vertical di-pole antenna is to restrict or limit the angle of reception, the main requirement being that adjacent di-pole antennae have reception angles that slightly overlap to avoid dead areas in reception, that the reception intensity curve be linear, and that the polar diagram shows only a single cardioid or elliptical shape 59, Fig. 9, and not a double one as is the case of an unshielded loop.

The narrower the reception angle, the more reflectors with antennae will be required. As an example, if the reception angle of any one reflector is 45° instead of 90° as indicated in Fig. 9, then eight instead of four reflectors with receivers will be required.

While it is possible to use only a single pair of receivers for any number of reflecting antennae by switching the two receivers sequentially to two adjacent antennae, such switching complications make an individual receiver for each antenna more desirable when there are only a small number of antennae involved.

The receiver unit 50 adapted for the reception of pulse modulated waves is shown in detail in Figs. 6 and 6—a; and as is indicated comprises four complete superheterodyne receivers 60, 61, 62 and 63 each having a vertically polarized pair of di-poles 60', 61', 62' and 63' connected to the respective input circuits. Output transformers 65, 66, 67 and 68 transfer through rectifiers 70, 71, 72 and 73, respectively, the received energies to corresponding pairs of deflectors 74—74', 75—75', 76—76' and 77—77' of the cathode ray tube 56. One of each pair of deflectors is shunted by a capacity-resistor 80, 81, 82 and 83, the other being grounded. It will be noted that alternate receivers are connected to alternately polarized deflectors i. e. horizontally or vertically, in order that any adjacent receivers forming a pair will differentially receiver a signal and will indicate in one quadrant of the screen 55 of the cathode ray tube 56. Thus the signal indications or radial lines 85, 86, 87 and 88 show, for example, the directions of the four beacon transmitters 21, 22, 23 and 24, each line having its characterizing dots. Reception in a diametrically opposite quadrant is prevented by the effects of the shielding reflector of the diametrically opposite di-pole antennae. The capacity-resistor shunts 80, 81, 82 and 83 provide an equal time constant to each pair of the deflectors, and are adjustable for the purpose of coordinating these time constants with the frequency of the pulse generator.

The frequency of the pulse generators is of great importance. It must be low enough in all cases to permit the spot to return to the center of the screen after each deflection, whether this deflection is produced by deflectors of the electromagnetic or electrostatic type, that is, coils or plates.

This means that the time constant of the spot as determined by the values of capacity and resistance shunting the deflectors must be such with relation to the frequency that the condenser is allowed sufficient time to completely charge and completely discharge between each pulse. I have found that a very satisfactory pulse frequency is fifteen per second, when used with cathode ray screens of medium persistence.

With screens of long persistence, pulse frequencies as low as two or three per second may be used. The timing of the pulse with relation to capacity and resistance is very critical, as it determines how much "center spot" shall appear on the screen, and whether the "center spot" will really be in the center of the screen or slightly shifted from center during the reception of signal energy, which condition would be fatal to accuracy.

The best conditions are such that the "center spot" is clearly defined as a dot of medium brilliance in the center of the screen but does not show halation or "sunburst" which would indicate too long a period between pulses or too low value of capacity and too low value of resistance. No "center spot" at all indicates too high a pulse frequency or too high value of capacity and of resistance.

I have found that with a pulse frequency of the order of ten per second, a satisfactory capacity for the condensers shunting the deflector plate may be of the order of .011 mfd. and the variable resistors or volume controls shunting this capacity may be of the order of 0 to 1 megohm. By varying these resistors, the speed of the spot to and from the center of the screen may be controlled. For example, if it is desired to produce a brilliant center spot, indicating high spot-speed with a comparatively long idle period during which the spot does not move, and hence causing a well-defined spot in the center of the screen, the volume controls are adjusted for comparatively low resistance, such as 250,000 ohms each. It is important that these variable resistors in addition be adjusted to compensate for any phase difference, in order to maintain straight line. This adjustment is usually very slight, being but a small proportion of the adjustment required for different spot speeds.

If it is desired to eliminate any center spot but to bring the signal lines to a neat vertex, the resistors should be increased, for example, to 400,000 ohms or to that value of resistance that will produce the desired effect.

The output transformers from each receiver to the corresponding rectifiers and deflector plates may conveniently be of the step-up type, that is, delivering a voltage increase from the receiver to the rectifier and have a 1-to-3 ratio or higher.

The rectifiers in series with the deflector plates should preferably be of low impedance triodes such as the R. C. A. 885, which is suitable for grid-controlled rectification, or the R. C. A. 30 battery triode, suitable for simple rectification with grid and plate strapped together as is common practice. Battery-heated rectifiers such as the 30 tube prevent line capacity effects. If the impedance of the rectifier is too high, the cut-off will be unsatisfactory and the resulting image distorted.

Figure 5A:
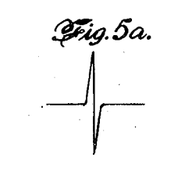
Figure 5B:
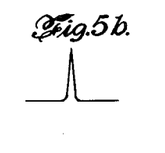
Figure 5C:
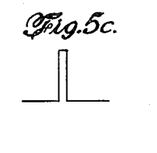
Figure 5D:
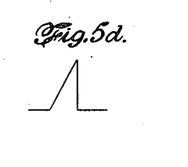

The wave shape of the pulse generator containing iron, i. e. the small machine 25 of Fig. 1, is very critical, in that the disposition of the pole pieces and their shape determine the course of the spot in producing a line. For example, if the wave form is delineated in the usual manner of a sine wave trace from pole pieces and their shape determine the course of the spot in producing a line. For example, if the wave form is delineated in the usual manner of a sine wave trace from pole pieces in close proximity to one another, it will be found that adjacent voltage curves merge, and a smoothing out effect exists to produce the resultant. This is the reason for widely separating the poles of the pulse generator. They are placed so far apart with relation to the area of the pole pieces that no interaction or merging effect is apparent and each pole produces a sharply rising voltage curve uninfluenced by its neighboring poles, as shown in Figs. 5—a and 5—b, the latter being after rectification.

In Fig. 7 there is indicated the same arrangement of shielded antennae 100, 101, 102 and 103 and superheterodyne receivers and deflector controls indicated by the blocks 104, 105, 106 and 107, as is set forth in Fig. 6; also a cathode ray tube viewing screen 108. The respective rectified signal outputs of the receivers are connected to four separate electrically conducting segments 110, 111, 112 and 113 which are adapted to be sequentially contacted in pairs by the two arms 114 and 115 of a rotating grounded switching member driven by a motor 116. By this expedient, only two adjacent receivers become operative at any one time, thereby preventing confusion by possible signals received from more than one earth quandrant at the same time. The foregoing arrangement permits the simultaneous reception of signals 117, 118, 119 and 120 from all four quadrants due to the persistence of vision in conjunction with screen persistence, as is well understood.

In order to make possible reception of both vertically and horizontally polarized waves, the compass antenna array comprises both vertical and horizontal shielded di-poles. Reference being had to Fig. 8 of the drawings, each receiver unit 125, 126, 127 and 128 includes a pair of di-poles of like polarization, diametrically opposite units being similarly polarized. Thus the units 125 and 127, for example, include the pair of vertically polarized di-poles 125' and 127'; and the units 126 and 128, the pair of horizontally polarized di-poles 126' and 128', all of the antennae being shielded, as shown, to allow reception of signals over a predetermined arc, for example, 90° in any direction in the corresponding azimuthal or altitudinal sense.

The respective outputs of the receiver pairs of a unit 125, 126, 127 and 128 are connected to vertical and horizontal deflectors 130—130', 131—131', 132—132' and 133—133' respectively, which deflectors together with the customary cathode and electron beam producing means (not shown) thus constitute four independent cathode ray tube structures. The beam spot to each tube structure, it will be noted, is located eccentrically relative to an individual tube structure and nearer the circumference of the screen than its center, as is indicated at 135, 136, 137 and 138. The line indications 139 and 140, for example. produced by signals from a distant station 141 having both vertically and horizontally disposed transmitting antennae 142 and 143, respectively, cross each other on the screen, due to the fact that a line may be extended across the face of the screen into any quadrant. To permit the cross over of any beam spot forming a line indication, it will be understood that the evacuated interior of the tube is to be without obstructions in the path of the beams.

Polarization of the pairs of receiving di-poles 127' and 128', for example, and transmitting di-poles 142 and 143 should correspond. The transmitter 143 of horizontally polarized waves conveniently transmits on a frequency of 20 mc., and transmitter 142 of the vertically polarized waves on a frequency of 10 mc, for example.

A reference cross 144 may be painted on the viewing screen 145 and is centrally located thereof with its lines directly over the luminous lines 139 and 140 indicating equi-signal reception of horizontally and vertically polarized waves respectively. The points on the screen where these luminous lines intersect may then indicate the combined azimuthal and altitudinal direction in degrees of a dual-polarized transmitter.

The deflectors 130—130', 131—131', 132—132' and 133—133' of each cathode ray tube structure should be so positioned relative to the plane of the viewing screen that the spot centers are located on the far side of the screen center from the transmitter and the direction of deflection is such that equal deflection of horizontal and vertical pairs of deflectors of any one tube structure will deflect a spot toward the center of the viewing screen in line with one of the lines of the reference cross 144 and toward the transmitter when the latter provides equi-signal reception. Otherwise it will be to one side of the cross 144, The beam spot, 135, controlled by the deflectors 132—132', for example, is located at the far side of the screen center in relation to the said reflectors. Likewise the beam spot controlled by deflectors 133—133' may be located or centered on the far side of the screen center.

Figure 10:
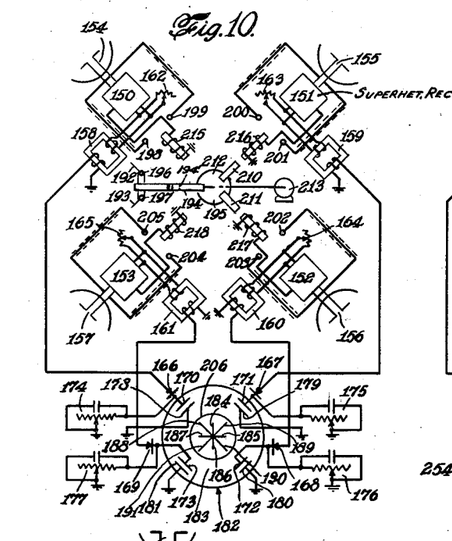
Fig. 10 is a schematic diagram illustrating a compass having associated therewith means for modulating incoming continuous electromagnetic waves by means of electrodynamic energizing pulses, together with means for equalizing the amplification factor of the various pairs of receivers.

A form of cathode ray radio compass suitable for receiving directional signals from continuous wave stations such, for example, as the beacon transmitters 45, 46, 47 and 48, Fig. 2, transmitting a carrier wave is shown in Fig. 10. In this embodiment, 150, 151, 152 and 153 designate superheterodyne receivers with vertical reflecting di-poles 154, 155, 156 and 157 connected respectively to the input circuit of each receiver. The output of each receiver is connected to the primary circuits of respective output transformers 158, 159, 160 and 161 across which are connected the volume controls or attenuators 162, 163, 164 and 165, and the secondaries of the output transformers are connected through the rectifiers 166, 167, 168 and 169 to the cathode ray tube deflectors 170, 171, 172 and 173, with shunt condenser-resistors 174, 175, 176 and 177. These deflectors are the active ones of a pair, the other deflectors of the pairs 178, 179, 180 and 181, diametrically opposite active deflectors, being grounded. A cathode ray tube, 182 having a viewing screen 183, the customary cathode and beam spot producing means (not shown) provides for forming the linear traces 184, 185, 186 and 187 of incoming signals. These linear traces are indicative of the direction of the said four continuous wave transmitters of the same frequency, transmitting independently of each other. In the particular embodiment shown, these directions are north, east, south and west, for example.

The intermediate and longer lines 188, 189, 190 and 191 on the screen, indicate linear traces formed by a beam spot from the action of the equalizing or non-directive vertical di-poles 192, 193 mounted on an insulated rotating arm 194 of the rotating pulse generator 195. These non-directive di-poles carry condenser electrodes 196 and 197 respectively, which form one of a pair of condensers, the other electrodes of the pair being shown at 198—199, 200—201, 202—203 and 204—205.

As the electrodes 196—197 on the arm 194 pass over each pair of electrodes 198—199, 200—201, 202—203 and 204—205 in succession, a magnet 194' to which arm 194 is attached energizes a receiver and the directive effect of the vertical di-poles 154, 155, 156, 157 is destroyed producing maximum response in each receiver. The maximum response of each receiver is then maintained equal to the others by adjusting the corresponding volume controls, 162, 163, 164, 165 until the lines or linear traces 188, 189, 190, 191 extend from screen center to the concentric circle 206 etched on the screen.

The relative positions of the signal equalizing lines do not change and being always extended to the boundary line of each screen quadrant not only do not interfere with the moving signal lines but serve as reference lines to define the four cardinal points of the magnetic compass—N, E, S and W. Rotating field magnets 210 and 211 of the pulse generator are shown, and the same may conveniently be permanent magnets located 90° apart and mounted on an insulated disc 212 driven by the motor 213. The stationary armature coils and cores 215, 216, 217 and 218 of the pulse generator may also be suitably insulated to prevent any undesirable capacity effects between adjacent receivers. As the field poles 210 and 211 pass successively in front of a pair of armature cores the respective receivers connected to that pair become active due to a pulse of very short duration being generated in the pair of armature coils and passed to the oscillators of the superheterodyne receivers associated with that particular pair of armature coils.

Figure 12:
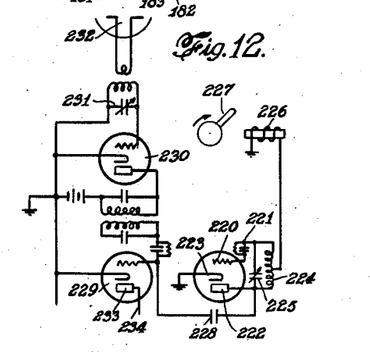
Fig. 12 is a schematic diagram of a conventional superheterodyne with novel oscillator, and pulse producing means for energizing the latter.

Thus, referring to Fig. 12, there is indicated in detail one of these special oscillators, having a grid 220 with grid leak condenser 221, plate 222, filament 223, tank coil 224, tank tuning condenser 225, plate voltage supply consisting of armature coil 26, and rotating field pole 227. The condenser 228 is the usual condenser affording capacity coupling to the first detector tube 229 of the superheterodyne receiver having a pre-selector circuit comprising a radio frequency amplifier tube 230, the input circuit of which is tuned by the condenser 231, and is coupled to the vertical di-pole 232. The plate 233 of the tube 229 is connected in the usual way to the intermediate frequency circuits 234 and hence to the final amplifier, the plate circuit of which is connected to the primary coil of one of the aforesaid output transformers 158, 159, 160, 161.

During the passage of the pulse generator field coils the two receiving armature coils are inactive, hence the corresponding superheterodyne oscillators are inactive and no signal is received by these receivers, leaving the electron beam of the cathode ray tube free to move in one direction only, i. e. that determined by the proportional value of energy as picked up by the active pair of receivers, and indicated as a line on the screen quadrant corresponding to the active receivers. If no continuous waves are being picked up by the receiver di-poles, the pulse created by the pulse generator and applied to the superheterodyne oscillator will not appear in the output transformer of the receiver. The change over from one pair of active receivers to another is sufficiently rapid, however, to show on the viewing screen due to persistence of vision, any signal line that may appear in any quadrant.

It is to be noted that due to the angular displacement of field poles and non-directional antennae electrodes, the equalizing linear traces are produced during an interval when the field poles are idle, and vice versa, thereby allowing the beam spot of the tube to return to screen center between each successive pulse generation, and between each equalizing action.

Because of the fact that all the receivers are idle except for the very brief interval when the pulse generator is active, static is greatly reduced, and only such static which happens to be present simultaneously with the pulse generated, is registered on the screen.

Figure 11:
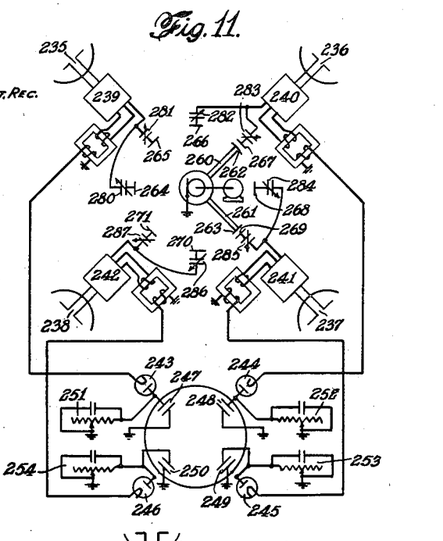
Fig. 11 is a similar view but in which the modulating means provides electrostatic pulses and effects also momentary tuning to the incoming waves.

Instead of effecting pulse modulation by electrodynamic means in the manner shown in Fig. 10, the modulation may be accomplished electrostatically. Thus, the di-pole antennae 235, 236, 237 and 238 are arranged similarly to those of the embodiment illustrated in Fig. 10; and the receivers with volume control or attenuators are also similar and are indicated by the blocks 239, 240, 241 and 242. The receiver outputs connect through transformers and rectifiers, in this instance, specifically, electronic rectifiers 243, 244, 245 and 246, to the corresponding pairs of deflectors 247, 248, 249 and 250 provided with corresponding capacity-resistor shunts 251, 252, 253 and 254.

However, in the instant embodiment, instead of the electrodynamic rotor, a grounded electrostatic rotor is provided, the same comprising a pair of rotatable arms 260 and 261 having arcuate conducting segments 262 and 263 at their tips adapted to afford momentary electrostatic induction between the grounded arms and insulated companion electrodes 264, 265, 266, 267, 268, 269, 270 and 271. These electrodes or segments form sequentially the grounded electrodes of temporary vernier condensers which with adjustable condensers 280, 281, 282, 283, 284, 285, 286 and 287 shunt the main tank tuning condenser 290 of the superheterodyne oscillator 291, Fig. 13. Thus a pair of the vernier condenser electrodes 292, Fig. 13, serve to tune the superheterodyne oscillator 291 of a corresponding receiver.

For clarity of explanation the equalizing condensers shown in Fig. 10 are omitted, as is the arm on the shaft carrying them.

The tank tuning condenser should be smaller in capacity than required for the tuning to desired signals within the wave band of the receiver in order that the additional shunt capacity of the vernier condensers may complete the tuning.

Figure 13:
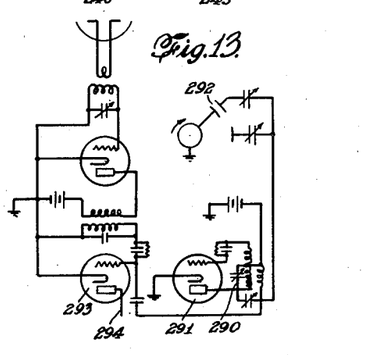
Fig. 13 is a similar view showing a conventional superheterodyne with novel oscillator and combined electrostatic pulse producing means and tuning means for the oscillator.

The critical tuning of the oscillator 291, especially in the 10 to 100 mc. band, permits relatively large vernier capacities with small arcuate electrodes. As the grounded rotating condenser electrodes pass in close proximity to the companion electrodes of a pair of receivers, there is generated momentarily a pulse in a first detector tube 293 and this pulse appears in the output plate circuit 294, if a signal is present from a distant transmitter in tune with the receivers.

If there are no signals brought into tune by the rotating condenser electrodes, no pulse is created in the first detector tube, and no pulse appears in a corresponding transformer. It will be noted in the instant embodiment that a pair of receivers is brought into resonance twice for every revolution of the pulse generator, thereby successively tuning the pair of receivers to two different frequencies from two different continuous wave transmitters, for example, 1.50 mc. and 1.51 mc. Additional frequencies may be added by providing additional electrodes.

The adjustable condensers 280, 281, 282, 283, 284, 285, 286 and 287 in series with the arcuate vernier condensers (as formed) may be of much larger capacity, and they may be made even larger than the main tank condenser if a wider wave band is desired. In this case the grounded arcuate electrode should make a wiping contact with its companion electrode as it passes over it, acting as a contact brush. The adjustable condensers 280, 281, 282, 283, 284, 285, 286 and 287 may then be adjusted to tune in any frequency within the desired wave band.

The pulse wave shape shown in Fig. 5—c is indicative of the wave shape generated when the two arcuate electrodes do not touch, thereby introducing a small condenser in series with the shunt adjustable one.

The pulse wave shape shown in Fig. 5—d is indicative of the wave shape generated when the two arcuate electrodes make wiping contact; thereby grounding one side of the adjustable condenser.

Figure 14:
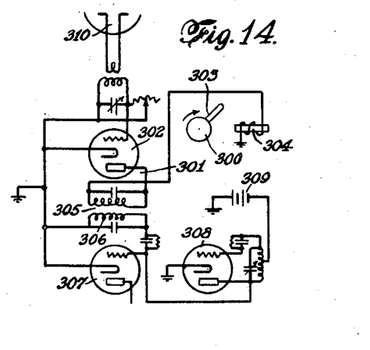
Fig. 14 is a similar view showing a conventional superheterodyne with conventional oscillator but with a novel superheterodyne pre-selector and pulse producing means for energizing the latter.

In Fig. 14 is shown an alternating form of pulse generating means of the electrodynamic type. In this instance, the energy from the pulse generator 300 is supplied to the plate circuit 301 of a standard pre-selector R. F. amplifier tube 302, which becomes active only when so supplied with plate current.

Thus, this pulse generator revolving field pole 303 induces a pulse in the armature coil 304 which provides plate current for the pre-selector R. F. amplifier tube through the primary of radio frequency transformer 305 from the armature coil 304. The plate circuit of this R. F. amplifier tube includes the primary coil 305, the associated secondary 306 feeding into a first detector tube 307 in the usual manner. The oscillator tube 308 is energized in this instance by the battery 309.

The pre-selector R. F. amplifier is normally inactive except when supplied with plate current from the pulse generator. The pulse current itself, being of audio frequency, cannot pass through the radio frequency coils of the radio frequency transformer and consequently does not affect the output of the receiver, but when a continuous wave is picked up by the vertical di-poles 310, and passed to the pre-selector amplifier, it is able to pass through the radio frequency transformer to the output circuit in the from of a momentary pulse of amplified radio frequency mixed and detected and amplified by the last stages of the superheterodyne receiver.

I claim:

1. A cathode ray radio compass for determining the direction of received electromagnetic waves, comprising at least two directional receiving antennae located at a predetermined angle to each other, corresponding receiver elements and means to tune said receiver elements to the frequency of said waves, together with translation means operatively associated with the respective receiver elements, the whole affording two substantially identical receiver channels; and a cathode ray tube coupled to said receiver channels and including means to produce a beam spot upon the viewing screen of the tube, deflectors for translating the beam spot in accordance with the received energy into a linear radial trace on said screen oriented to the source of the electromagnetic waves, and pulse generating means having a straight line characteristic for shaping the waves energizing said deflectors.

2. The cathode ray radio compass of claim 1, wherein each directional receiving antenna is shielded for a predetermined reception angle.

3. The cathode ray radio compass of claim 1, wherein each directional receiving antenna is shielded to an extent to limit its reception angle to avoid quadrantal error.

4. The cathode ray radio compass of claim 1, wherein the pulse generating means is located at the source of the waves.

5. The cathode ray radio compass of claim 1, wherein the pulse generating means is located at the receiver elements.

6. The cathode ray radio compass of claim 1, wherein the pulse generating means is of the electrodynamic type having widely-separated, narrow pole tips to afford a sharply peaked wave.

7. The cathode ray radio compass of claim 1, wherein the pulse generating means is of the polyphase electrodynamic type having widely-separated, narrow pole tips affording a sharply peaked wave.

8. The cathode ray radio compass of claim 1, wherein the pulse generating means is of the polyphase electrodynamic type having widely-separated, narrow and characterizing pole tips affording sharply peaked waves.

9. The cathode ray radio compass of claim 1, wherein the pulse generating means is of the electrostatic type having widely-separated, narrow pole tips affording a sharply peaked wave.

10. The cathode ray radio compass of claim 1, wherein the pulse generating means is of the relaxation type with electronic tube characteristics affording a saw-toothed wave.

11. The cathode ray radio compass of claim 1, wherein the pulse generating means is of the relaxation type with electronic tube characteristics affording a flat-topped wave.

12. The cathode ray radio compass of claim 1, wherein a plurality of pairs of receiver antennae are provided, each of the pairs being shielded to limit the reception angle of such pair to deflect the beam spot of the cathode ray tube to a selected quadrant of the viewing screen of said tube.

13. The cathode ray radio compass of claim 1, wherein a plurality of pairs of receiver antennae are provided and a plurality of cathode ray tubes corresponding in number to the pairs of directional receiving antennae, said tubes having their respective indications grouped upon a common screen for simultaneous viewing of the corresponding traces thereon.

14. The cathode ray radio compass of claim 1, wherein a plurality of pairs of receiver antennae are provided, each pair being shielded to limit the reception angle of such pair, and a plurality of cathode ray tubes corresponding in number to the pairs of antennae is provided and said tubes are adapted respectively to receive the energies controlled by the antennae pairs, and their indications being grouped upon a common screen for simultaneous viewing of the corresponding traces produced thereon.

15. The cathode ray radio compass of claim 1, wherein a plurality of pairs of receiver antennae and corresponding receiver channels are provided, and switching means connect respective pairs of antennae through their respective channels to selected quadrants of the cathode ray tube screen.

16. The cathode ray radio compass of claim 1, wherein a plurality of pairs of receiver antennae and corresponding receiver channels are provided, and switching means connect respective pairs of antennae momentarily through their respective channels to selected quadrants of the cathode ray tube screen.

17. The cathode ray radio compass of claim 1, wherein a plurality of pairs of receiver antennae and corresponding receiver channels are provided, and mechanical switching means connect respective pairs of antennae through their respective channels to selected quadrants of the cathode ray tube screen.

18. The cathode ray radio compass of claim 1, wherein a plurality of pairs of receiver antennae and corresponding receiver channels are provided, and electrodynamic pulse switching means connect respective pairs of antennae through their respective channels to selected quadrants of the cathode ray tube screen.

19. The cathode ray radio compass of claim 1, wherein a plurality of pairs of receiver antennae and corresponding receiver channels are provided, and electrostatic pulse switching means connect respective pairs of antennae through their respective channels to selected quadrants of the cathode ray tube screen.

20. The cathode ray radio compass of claim 1, wherein a plurality of pairs of receiver antennae and corresponding receiver channels are provided, and switching means connect respective pairs of antennae momentarily through their respective channels to selected quadrants and simultaneously therewith operate momentarily the tuning means.

21. The combination with a cathode ray radio compass having a quadrantal screen and beam spot deflecting means including pairs of deflectors, said compass comprising at least two antennae, and corresponding translation means adapted for connection therewith and for connection respectively to different pairs of deflectors of the cathode ray tube for the transmission of the received energy thereto, together with energy rectifying means for converting the energy received from the respective translation means into direct current, of electrical switching means transferring the respective rectified energies to corresponding pairs of deflectors, including means to reverse the polarity of the energy rectifying means with respect to pairs of deflectors and shift the connections from the channels to selected pairs of deflectors to cause the beam spot to appear in a selected quadrant.

22. In a cathode ray radio compass having a screen and beam spot deflecting means including pairs of deflectors: means for producing a straight-line trace of the beam spot, comprising at least two antennae, and corresponding translation means adapted for connection therewith and for connection respectively to different pairs of deflectors of the catode ray tube for the transmission of the received energy thereto, together with means for converting the energy received from the respective translation means into direct current, and a pulse generator cooperatively associated with each translation means for simultaneously modulating the direct current therefrom to produce thereby a straight-line resultant of the beam spot extending radially outward from the center of the screen in one direction only.

23. The combination with a cathode ray radio compass having a screen and beam spot deflecting means including pairs of deflectors, of direction-finding means including at least two antennae, and corresponding translation means adapted for connection therewith and for connection respectively to different pairs of deflectors, together with switching means for applying the energy received by the direction-finding means alternately to each pair of deflectors at a frequency consistent with the screen persistence to permit persistence of vision, thereby producing corresponding straight-line images on the screen, one from each pair of deflector plates, the lengths of which are indicative of the amplitude of the respective output of the translation means.

24. In a cathode ray radio compass having a screen and beam spot deflecting means including pairs of deflectors: means for producing a straight-line trace of the beam spot extending radially outward from the center of the screen, comprising at least two antennae, and corresponding translation means adapted for connection therewith and for connection respectively to different pairs of deflectors for the transmission of the received energy thereto, together with means for converting the energy received from the respective translation means into direct current, and means to supply the received energy sequentially to the respective pairs of deflectors for producing traces on the screen in accordance with the horizontal and vertical characteristics of the individual pairs of deflectors.

25. In a cathode ray radio compass having a screen and beam spot deflecting means including pairs of deflectors: means for producing a straight-line trace of the beam spot extending radially outward from the center of the screen, comprising at least two antennae, and corresponding translation means adapted for connection therewith and for connection sequentially to different pairs of deflectors for the transmission of the received energy thereto, together with means for converting the energy received from the respective translation means into direct current, and a pulse generator cooperatively associated with each translation means for simultaneously modulating the direct current therefrom to produce thereby a corresponding straight line image on the screen one from each pair of deflectors, the length of which lines are indicative of the amplitude of the respective outputs of the translation means.

26. The cathode ray radio compass of claim 24, wherein attenuating means are included in each translation means for varying the respective output circuits of the translation means.

27. The cathode ray radio compass of claim 25, wherein means are provided to vary the amplitude of the output of a selected one of the translation means to equalize the effects of the two translation means on the deflector means.

28. The combination with a cathode ray radio compass having a screen and beam spot deflecting means including pairs of deflectors, of two directional antennae, and corresponding translation means adapted for connection therewith and for connection respectively to different pairs of deflectors, together with switching means for applying sequentially the energy received by the two antennae alternately to each pair of deflectors at a frequency consistent with the screen persistence to permit persistence of vision, thereby producing simultaneously viewable corresponding straight-line images on the one screen from each pair of deflectors, the lengths of which lines are indicative of the amplitude of the respective outputs of the translation means.

29. The cathode ray radio compass of claim 28, wherein the antennae comprise two systems, one of the directional type and the other of the non-directional type and the received energy from the systems is applied sequentially, the resulting images produced on the screen being indicative of the location of the source of the energy received by the said directional antenna system and of the equality of the translation means, respectively.

30. The combination with a cathode ray radio compass having a screen and beam spot deflecting means including pairs of deflectors, of at least two antennae, and corresponding translation means adapted for connection therewith and for connection respectively to different pairs of deflectors, and means intermediate the translation means for rectifying the respective outputs of each translation means, and condensers connected respectively across one deflector of each of the pairs of deflectors, together with resistors connected in shunt with each condenser, the time constants of the respective pairs of condenser and resistance being identical and having a predetermined relationship to the wave shape of the output energy of the transformers.

31. The combination of claim 30, wherein the resistors connected in shunt with the condensers are variable for controlling the speed of the spot to the center of the screen.

EDWARD G. GAGE.

REFERENCES CITED

The following references are of record in the file of this patent:

UNITED STATES PATENTS

| Number | Name | Date |
|---|---|---|
| 894,318 | De Forest | July 28, 1908 |
| 2,284,812 | Gage | June 2, 1942 |
| 2,399,671 | Gage | May 7, 1946 |
| 2,408,039 | Busignies | Sept. 24, 1946 |
| 2,422,109 | Luck | June 10, 1947 |